United States Patent [19]

Lee et al.

[11] 4,405,576

[45] Sep. 20, 1983

[54] REMOVAL OF SULFATE IONS FROM BRINE

[75] Inventors: John M. Lee; William C. Bauman, both of Lake Jackson, Tex.

[73] Assignee: The Dow Chemical Company, Midland, Mich.

[21] Appl. No.: 307,826

[22] Filed: Oct. 2, 1981

[51] Int. Cl.$^3$ .......................... B01J 41/12; C02F 1/42
[52] U.S. Cl. ........................................ 423/181; 521/28
[58] Field of Search ........................... 521/28; 423/181

[56] References Cited

U.S. PATENT DOCUMENTS

| | | | |
|---|---|---|---|
| 3,041,292 | 6/1962 | Hatch | 521/28 |
| 3,346,422 | 10/1967 | Berger | 521/28 |
| 3,352,800 | 11/1967 | Smith et al. | 521/28 |

Primary Examiner—Joseph L. Schofer
Assistant Examiner—Peter F. Kulkosky
Attorney, Agent, or Firm—W. J. Lee

[57] ABSTRACT

Macroporous cation exchange resins with sulfonic acid functional groups having polymeric hydrous zirconium oxide and polyacrylic acid contained therein are useful in substantially removing sulfate, borate, bicarbonate and/or phosphate ions from alkali metal salt solutions.

12 Claims, No Drawings

REMOVAL OF SULFATE IONS FROM BRINE

BACKGROUND OF THE INVENTION

Various alkali metal halide aqueous solutions or alkaline earth metal halide aqueous solutions, e.g., NaCl brine or $MgCl_2$ brine, contain sulfate values or sulfate ions which are considered detrimental if the aqueous solution is intended for use in certain applications, such as in electrolytic processes. There are commercial incentives to substantially removing the sulfate ions.

It is known that hydrous zirconium oxide and other zirconium compounds, such as zirconium phosphates, are useful as inorganic ion exchangers.

SUMMARY OF THE INVENTION

An amorphous polymeric hydrous zirconium oxide is formed within the resin beads of a macroporous cation exchange resin of the sulfonic acid type and acrylic acid is polymerized within the bead matrix, thereby forming novel ion exchange composite structures which are useful in removing sulfate, borate, bicarbonate, and/or phosphate ions from alkali metal halide brines.

DETAILED DESCRIPTION

It is known that zirconium hydroxide is prepared by alkali precipitation of an aqueous solution of a zirconyl salt. For the present invention it is preferred that the alkali be ammonia since it is more efficiently washed out than the alkali metal hydroxides or alkaline earth metal hydroxides. Precipitation at cold (ambient) temperature gives a gelatinous product which is substantially $Zr(OH)_4$ containing about 26.5% water or more. A partially dehydrated zirconyl hydroxide, $ZrO(OH)_2$, results from drying it at elevated temperature (e.g., 100° C.), or from hot-precipitation (e.g., 85° C.) followed by hot drying.

Thus, in the present invention the expression "hydrous zirconium oxide" has within the purview of its meaning any of the various amorphous polymeric hydrated forms of zirconium oxide which are substantially or largely insoluble in plain water.

The macroporous cation exchange resin is one which contains sulfonic acid ($SO_3^-$) functional groups. Such resins are available commercially, such as sulfonated polymers of styrene crosslinked with divinylbenzene. For instance a macroporous cation exchange resin with $SO_3^-Na^+$ groups affixed to a styrene-divinylbenzene resin structure is sold by The Dow Chemical Company under the tradename DOWEX MSC-1-$NA^+$. It is within the purview of the present invention to use any porous resin containing sulfonic acid functional groups, so long as the resin is substantially inert or non-reactive, when used in the present invention, except for the reactivity of the sulfonic acid functionality groups.

In general, the polymeric hydrous zirconium oxide is formed within the resin beads by wetting the resin with an aqueous solution of a soluble zirconyl compound, such as $ZrOCl_2.8H_2O$. If excessive zirconyl solution is present, it should be drained off and the resin substantially dried, such as by air-drying. The dried resin, containing the zirconyl compound is neutralized, preferably by use of $NH_4OH$, thereby forming polymeric $ZrO(OH)_2$ and/or $Zr(OH)_4$. Excess $NH_4OH$ and $NH_4Cl$ (which forms) is washed out, such as by repeated contact with water or NaCl brine. The composite is impregnated with acrylic acid which is polymerized in-situ with a free-radical or redox polymerization initiator or catalyst. The composite is then preferably treated with an acid, e.g., with HCl.

In the general process outlined above, the beginning zirconyl compound may be $ZrOCl_2.xH_2O$ or the like, such as $Zr(NO_3)_4.5H_2O$, $ZrOBr_2.xH_2O$, $ZrOI_2.8H_2O$, or $Zr(SO_4)_2.4H_2O$, or any such zirconium compound which will precipitate to form $Zr(OH)_4$ and/or $ZrO(OH)_2$ when contacted with a base, especially $NH_4OH$. The so-formed $Zr(OH)_4$ and/or $ZrO(OH)_2$, also called "zirconium hydrous oxide" or "zirconyl hydrate", is an amorphous, polymeric structure. Following the above alkalizing step, acrylic acid monomer is polymerized in-situ in the composite; the acid used for lowering the pH is preferably HCl, but may also be HBr, HI, $HNO_3$, and the like.

Polymerization of acrylic acid in aqueous solution is readily and conveniently carried out by application of heat, especially in the presence of a free-radical generator, e.g., a small amount of $K_2S_2O_8$. Redox initiators may also be used. The addition of and in-situ polymerization of acrylic acid may, alternatively, be performed prior to addition of and precipitation of the zirconium compound. Other polymerizable carboxylic acid monomers may be used, e.g., methacrylic acid, but acrylic acid is preferred because it is the smallest in molecular size of the unsaturated carboxylic acids.

As stated above, once the resin has been acidized, the composite is ready to take on $SO_4^=$ values from alkali metal salt brine. This is done, for example, by placing the composite in a vessel, preferably a column, and passing sulfate-containing brine through the composite until the composite is substantially "loaded" with $SO_4^=$ values and is ready for another water-washing.

It is within the purview of this invention that the alkali metal salt brine may be a natural brine, such as seawater or mineral brine, a LiCl brine, a KCl brine, or an alkali metal salt brine which comes from an ore dressing, ore leaching, mineral dressing, and the like. The brine may contain only a small amount, say less than about 1% of hardness values, preferably less than about 0.1% hardness values. The present novel composite exhibits a high affinity for, and a strong preference for, $SO_4^=$ ions, but is also effective for borate, bicarbonate, and/or phosphate ions.

In certain embodiments the product may be described as a macroporous ion exchange resin of the sulfonated styrene-divinyl benzene type (e.g., DOWEX ® MSC-1) containing throughout its bead structure gelatinous zirconium hydroxide or zirconyl hydroxide, and further modified by polyacrylic acid formed by absorbing monomeric acrylic acid into the structure and polymerizing in situ. The resin is initially activated for $SO_4^=$ pick-up by acidizing to 2-3 pH with HCl, thus converting the polymeric $Zr(OH)_4$ to a polymer of the composition $Zr(OH)_3Cl$. The $SO_4^=$ pick-up is an exchange of $2Cl^-$ for $1SO_4^=$. Water regeneration removes $Na_2SO_4$; the $SO_4^=$ comes from the $(Zr(OH)_3^+)_2SO_4^=$ and the $Na^+$ from the $—SO_3^-Na^+$ and the $—COO^-Na^+$.

The initial resin generally contains on the order of at least about 1 meq. $—SO_3^-H^+$ groups per ml, $Zr(OH)_4$ is added to about 0.8 atom Zr per atom S, and acrylic acid is added to approximately 1 molecule per atom Zr.

Preferred operation is counterflow at rates of 0.01–0.1 $V_B$/min. at 40°–60° C. with about 2 to about 3 pH. The flow rate may be increased to 0.2–0.25 $V_B$/min. at 100°–120° C. where hot salt brine and water are available. At pH values of much less than 2 the COONa will be present as COOH and thus will reduce the efficiency of $H_2O$ regeneration; at pH values much above about 3 some of the Zr will exist as $Zr(OH)_4$ and pick up much less $SO_4^=$.

The following is intended to illustrate the present invention, but the invention is not limited to the particular embodiment examples shown.

EXAMPLE

Performance in the removal of $SO_4^=$ from 26% NaCl with water regeneration is compared between resins with and without —COOH groups. Detailed preparation and operating data are given below.

About 150 ml of DOWEX® MSC-1(8% DVB, 50–100 mesh ground) in $H^+$ form was washed and put in a glass column. 32% aqueous $ZrOCl_2$ was run through the column downflow until the effluent density was the same as the influent. $N_2$ gas was run through the resin until it was dry and free flowing. Dry weight was 119.7 gms. This resin was poured into 120 ml of 30% aqueous $NH_3$ and allowed to react for 15 minutes. The resin was washed well with water and then with 26% NaCl. Immersed in excess 26% NaCl it was titrated with N/1 HCl to 2.4 pH requiring 85 meq. HCl. The resin volume was now 130 ml. 116 ml of resin was put in a column and operated upflow with 25% NaCl containing 1800 mg/l $SO_4^=$ at 2.4 pH at 10 ml/min and 72° C. 715 ml of brine effluent was obtained with the last 100 ml analyzing 1230 mg/l $SO_4$. The resin was regenerated with water downflow at 3.3 ml/min and 72° C., taking cuts of the effluent for analysis.

| Cut # | Vol. (ml) | $SO_4^=$(mg/l) |
|---|---|---|
| 1 | 50 | 1690 |
| 2 | 25 | 1114 |
| 3 | 10 | 1114 |
| 4 | 10 | 2256 |
| 5 | 10 | 3504 |
| 6 | 10 | 3331 |
| 7 | 10 | 2928 |
| 8 | 10 | not analyzed |
| 9 | 50 | 1981 |

Brine was then run upflow again at 10 ml/min and 72° C., with effluent cuts.

| Cut # | Vol. (ml) | $SO_4^=$(mg/l) |
|---|---|---|
| 1 | 50 | not analyzed |
| 2 | 30 | not analyzed |
| 3 | 50 | 538 |
| 4 | 100 | 902 |
| 5 | 100 | 1114 |

The resin (130 ml) was then well washed with water and sucked almost dry. It was added to a stirred pot with 75 ml $H_2O$ and a solution containing 20 ml $H_2O$, 5 gm. acrylic acid, and 0.2 gm. $K_2S_2O_8$. The mix was stirred for 60 minutes at 25° C. to initiate polymerization. The mix was then put in a beaker, covered with aluminum foil and put in a 95° C. oven overnight to complete polymerization. It boiled to dryness with a small amount of overflow and loss of resin. It was washed with water to give a resin volume of 124 ml (hence a loss of 6 ml). Immersed in 26% NaCl and titrated up to 2.4 pH with 3 ml N/1 NaOH. 116 ml of resin was put in a column and saturated upflow with 900 ml of 2.4 pH 26% NaCl containing 1800 mg/l $SO_4^=$, at a flow rate of 10 ml/min and a temperature of 72° C.

The resin was then regenerated downflow with water at 3.2 ml/min and 72° C., taking cuts of the effluent for $SO_4$ analysis:

| Cut # | Vol. (ml) | $SO_4^=$(mg/l) |
|---|---|---|
| 1 | 50 | 1,690 |
| 2 | 25 | 1,517 |
| 3 | 10 | 2,976 |
| 4 | 10 | 8,736 |
| 5 | 10 | 11,616 |
| 6 | 10 | 9,456 |
| 7 | 10 | 7,776 |
| 8 | 10 | 5,904 |
| 9 | 10 | 4,772 |
| 10 | 10 | 4,147 |
| 11 | 10 | not analyzed |
| 12 | 10 | 3,312 |
| 13 | 10 | not analyzed |
| 14 | 10 | not analyzed |
| 15 | 25 | not analyzed |
| 16 | 50 | 1,440 |

Other embodiments will become apparent to persons skilled in the art without departing from the scope of the presently disclosed invention.

We claim:

1. Macroporous cation exchange resin beads having sulfonic acid functional groups and having post-deposited therein polymeric hydrous zirconium oxide and polyacrylic acid.

2. A process for preparing a composite of macroporous cation exchange resins having sulfonic acid functional groups and having polymeric hydrous zirconium oxide and polyacrylic acid contained therein, said process comprising wetting macroporous cation exchange resin beads having sulfonic acid functional groups with an aqueous solution of a zirconyl compound which forms a precipitated hydrous zirconium oxide when alkalized, alkalizing said zirconyl compound by contacting it with an alkaline material, thereby precipitating hydrous zirconium oxide in said resin, incorporating acrylic acid in the so-formed composite, and polymerizing the acrylic acid in-situ.

3. The process of claim 2 wherein the zirconyl compound is at least one selected from the group consisting of hydrates of $ZrOCl_2$, $Zr(NO_3)_4$, $ZrOBr_2$, $ZrOI_2$, and $ZR(SO_4)_2$.

4. The process of claim 2 wherein the alkaline material is ammonia.

5. The process of claim 2 wherein there are performed the additional steps of washing out of ammonium compounds prior to addition of the acrylic acid and acidizing the composite after the in-situ polymerization of the acrylic acid.

6. The process of claim 5 wherein the acidizing is performed by using at least one acid of the group consisting of HCl, HBr, HI, and $HNO_3$.

7. The process of claim 6 wherein the acid is HCl.

8. The process of claim 2 wherein the in-situ polymerization of acrylic acid is performed prior to the introduction of the zirconyl compound.

9. A process for removing sulfate, borate, bicarbonate and/or phosphate ions from an aqueous alkali metal salt solution, said process comprising contacting said alkali metal salt solution with a macroporous cation exchange resin having sulfonic acid functional groups and having post-deposited therein hydrous zirconium oxide and polyacrylic acid.

10. The process of claim 9 wherein the alkali metal salt is NaCl.

11. The process of claim 9 wherein the alkali metal salt is LiCl.

12. The process of claim 9 wherein sulfate ions are removed from brine.

* * * * *

UNITED STATES PATENT AND TRADEMARK OFFICE
CERTIFICATE OF CORRECTION

PATENT NO. : 4,405,576
DATED : September 20, 1983
INVENTOR(S) : John M. Lee and William C. Bauman It is certified that error appears in the above—identified patent and that said Letters Patent is hereby corrected as shown below:

Col. 1, line 50, "MSC-1-NA$^+$." should read --MSC-1-Na$^+$.--.

Col. 4, line 49, "ZR(SO$_4$)$_2$." should read --Zr(SO$_4$)$_2$.--.

Signed and Sealed this

Seventeenth Day of January 1984

[SEAL]

Attest:

GERALD J. MOSSINGHOFF

Attesting Officer     Commissioner of Patents and Trademarks